US011916319B2

(12) United States Patent
Emara et al.

(10) Patent No.: US 11,916,319 B2
(45) **Date of Patent: *Feb. 27, 2024**

(54) FILAR ANTENNA ELEMENT DEVICES AND METHODS

(71) Applicant: TALLYSMAN WIRELESS INC., Kanata (CA)

(72) Inventors: Mohamed Emara, Ottawa (CA); Julien Hautcoeur, Gatineau (CA); Gyles Panther, Ottawa (CA); Joseph Botros, Ottawa (CA)

(73) Assignee: Tallysman Wireless Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,380

(22) Filed: Mar. 20, 2023

(65) Prior Publication Data

US 2023/0231313 A1 Jul. 20, 2023

Related U.S. Application Data

(63) Continuation of application No. 17/668,718, filed on Feb. 10, 2022, now Pat. No. 11,631,939, which is a (Continued)

(51) Int. Cl.
*H01Q 1/48* (2006.01)
*H01Q 1/36* (2006.01)
(Continued)

(52) U.S. Cl.
CPC ............... *H01Q 9/42* (2013.01); *H01Q 1/362* (2013.01); *H01Q 1/48* (2013.01); *H01Q 5/307* (2015.01);
(Continued)

(58) Field of Classification Search
CPC ............ H01Q 9/42; H01Q 1/362; H01Q 1/48; H01Q 5/307; H01Q 5/335; H01Q 5/35;
(Continued)

(56) References Cited

U.S. PATENT DOCUMENTS

| | | |
|---|---|---|
| 6,011,524 A | 1/2000 | Jervis |
| 7,245,268 B2 | 7/2007 | O'Neill et al. |

(Continued)

*Primary Examiner* — Jean B Jeanglaude
(74) *Attorney, Agent, or Firm* — Rosenberg, Klein & Lee

(57) ABSTRACT

Single band and multiband wireless antennas are an important element of wireless systems. Competing tradeoffs of overall footprint, performance aspects such as impedance matching and cost require not only consideration but become significant when multiple antenna elements are employed within a single antenna such as to obtain circular polarization transmit and/or receive. Accordingly, it would be beneficial to provide designers of a wide range of electrical devices and systems with compact single or multiple frequency band antennas which, in addition to providing the controlled radiation pattern and circular polarization purity (where required) are impedance matched without substantially increasing the footprint of the antenna and/or the complexity of the microwave/RF circuit interfaced to them, whilst supporting multiple signals to/from multiple antenna elements in antennas employing them. Solutions present achieve this through provisioning one or more capacitive series reactances discretely or in combination with one or more shunt capacitive reactances.

12 Claims, 10 Drawing Sheets

Related U.S. Application Data continuation of application No. 16/858,997, filed on Apr. 27, 2020, now Pat. No. 11,251,533.

(60) Provisional application No. 62/839,144, filed on Apr. 26, 2019.

(51) Int. Cl.

| | |
|---|---|
| ***H01Q 5/307*** | (2015.01) |
| ***H01Q 5/335*** | (2015.01) |
| ***H01Q 5/35*** | (2015.01) |
| ***H01Q 5/50*** | (2015.01) |
| ***H01Q 9/42*** | (2006.01) |
| *H01Q 1/24* | (2006.01) |

(52) U.S. Cl.

CPC ............... *H01Q 5/335* (2015.01); *H01Q 5/35* (2015.01); *H01Q 5/50* (2015.01); *H01Q 1/247* (2013.01)

(58) Field of Classification Search

CPC .......... H01Q 5/50; H01Q 1/247; H01Q 1/241; H01Q 5/321; H01Q 5/371; H01Q 5/385; H01Q 21/30

See application file for complete search history.

(56) References Cited

U.S. PATENT DOCUMENTS

| | | | |
|---|---|---|---|
| 7,609,226 B1 | 10/2009 | MacGahan et al. | |
| 8,624,795 B2 | 1/2014 | Leisten | |
| 2004/0108964 A1 | 5/2004 | McKivergan et al. | |
| 2006/0022891 A1 | 2/2006 | O'Neill et al. | |
| 2008/0094308 A1 | 4/2008 | Cowles | |
| 2010/0231478 A1 | 9/2010 | Leisten | |
| 2011/0001680 A1 | 1/2011 | Leisten | |
| 2011/0254755 A1* | 10/2011 | DiNallo | H01Q 11/08 343/893 |
| 2017/0263997 A1 | 9/2017 | Daniel et al. | |

* cited by examiner

FILAR ANTENNA ELEMENT DEVICES AND METHODS

CROSS-REFERENCE TO RELATED APPLICATIONS

This patent application claims the benefit of priority as a continuation of U.S. patent application Ser. No. 17/668,718 filed Feb. 10, 2022; which itself claims the benefit of priority as a continuation of U.S. patent application Ser. No. 16/858,997 filed Apr. 27, 2020, now issued as U.S. Pat. No. 11,251,533; which itself claims the benefit of priority from U.S. Provisional Patent Application 62/839,144 filed Apr. 26, 2019; the entire contents of each are incorporated herein by reference.

FIELD OF THE INVENTION

This patent application relates to antennas and more particularly to compact single band and multiband antennas for wireless systems such as satellite aided navigation and mobile satellite communications.

BACKGROUND OF THE INVENTION

A global satellite navigation system (satnav) or global navigation satellite system (GNSS) is a system that exploits a network of autonomous geo-spatially positioned satellites to provide geolocation and time information to a suitable receiver anywhere on or near the Earth where there is an unobstructed line of sight. Whilst timing information can be obtained from line of sight to a single satellite geo-spatial location requires line of sight to three (at sea level) or four satellites as a minimum.

In applications where relatively low precision is required low complexity surface mount patch antennas are generally employed accessing a single GNSS signal. However, other applications requiring high precision of timing and/or location require accurately tuned, wider bandwidth, antennas which, ideally, support multiple frequency operation providing higher fidelity reception and thereby improved multipath rejection and better output phase linearity.

Even within these applications there is a constant drive for compact multiband antennas that can be easily integrated into portable devices or more generally into mobile platforms and equipment. These antennas should provide a controlled radiation pattern, namely a uniform coverage of the upper hemisphere of their radiation pattern and circular polarization purity to improve cross-polarization rejection and hence multipath rejection. Additionally, it is desirable for these antennas to be electromagnetically isolated from the chassis and/or any conductive ground structures external to the antenna allowing for their integration into multiple platforms with minimal redesign.

However, the overall footprint of a GNSS antenna is a combination of both the physical antenna itself and its associated electronics. Accordingly, a GNSS antenna is normally deployed together with an impedance matching circuit and either a low noise amplifier for receivers or power amplifier for transmitters. Where multiple antenna elements are employed to either receive or transmit a common signal, e.g. with four antenna elements each fed with the common signal with defined phase relationships for each antenna element, then a microwave circuit such as a quadrature splitter or combiner for example is also employed.

However, with multiple antenna elements within a single antenna the design of the matching network can be challenging as the multiple antenna elements should be matched simultaneously.

Accordingly, it would be beneficial to provide designers of a wide range of electrical devices and systems with compact multiple frequency band antennas which, in addition to providing the controlled radiation pattern and circular polarization purity are impedance matched without substantially increasing the footprint of the antenna and/or the complexity of the microwave/RF circuit interfaced to them which provides the multiple signals to the multiple antenna elements. This is achieved through provisioning one or more capacitive series reactances discretely or in combination with one or more shunt capacitive reactances.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to antennas and more particularly to compact single band and multiband antennas for wireless systems such as satellite aided navigation and mobile satellite communications.

In accordance with an embodiment of the invention there is provided a filar antenna comprising:

a feeding network on a circuit board comprising a ground plane and a combining network with a plurality of feed points; and a filar antenna with an equal plurality of filar nodes, wherein said combining network comprised of circuit elements effective to constructively sum microwave electrical signals present at each of said feed points, each of said electrical signals having a predetermined relative phase relationship, each of said feed points connected to a matching circuit consisting of a capacitive series reactance, each of said series reactances connecting one of said feed points to a corresponding one of said filar nodes, effective to present a characteristic impedance at each of said feed points;

said filar antenna comprising a plurality of first filar elements and a plurality of second filar elements alternately arranged about a circumference and above the circuit board, wherein the plurality of first filar elements each have a first electrical length and the plurality of second filar elements each have a second electrical length, different from the first length, wherein the first electrical length of each of the plurality of first filar antennal elements is established in dependence upon an odd multiple of quarter wavelength of a first operating frequency and wherein the second electrical length of each of the plurality of second filar antenna elements is established in dependence upon an odd multiple a quarter wavelength of a second operating frequency, wherein each of the plurality of first filar elements includes a first end and an open, distal second end, and wherein each of the plurality of second filar elements includes a first end and an open, distal second end, said first ends of first filar elements constitutes one of said filar nodes, each of said filar nodes further coupled to a corresponding one of said first ends of said second filar elements.

In accordance with an embodiment of the invention there is provided a filar antenna comprising:

a feeding network on a circuit board comprising a ground plane and a combining network with a plurality of feed points; and a filar antenna with an equal plurality of filar nodes, wherein said combining network comprised of circuit elements effective to constructively sum microwave electrical signals present at each of said feed points, each of said electrical signals having a predetermined relative phase relationship, each of said feed points connected to a matching circuit consisting of a capacitive series reactance, each of said series reactances connecting one of said feed points to a corresponding one of said filar nodes, effective to present a characteristic impedance at each of said feed points;

said filar antenna including a plurality of sets of filar antenna elements each comprising a plurality of filar elements arranged in a first predetermined configuration within each set of filar antenna elements of the plurality of sets of filar antenna elements and in a second predetermined configuration relative to and above the circuit board, wherein each filar element of the set of filar elements of the plurality of sets of filar elements has an electrical length different from an electrical length of the other filar elements of the set of filar elements of the plurality of sets of filar elements which is established in dependence upon an odd multiple of quarter wavelength of an operating frequency of the filar element of the plurality of filar elements, has a first end and an open, distal second end, and wherein said first end of the first filar element within each the set of filar elements of the plurality of sets of filar elements constitutes one of said filar nodes, each of said filar nodes further coupled to a corresponding said first end of each other filar element of the set of filar elements of the plurality of sets of filar elements.

In accordance with an embodiment of the invention there is provided a filar antenna element comprising:

a first filar antenna element comprising a first conductor of first predetermined length, a first predetermined width and first predetermined thickness disposed above a ground plane; and a first capacitor electrically coupled between a first end of the first conductor and a feed point for either receiving a first microwave signal to be radiated by the first conductor or receiving a second microwave signal from the first conductor.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
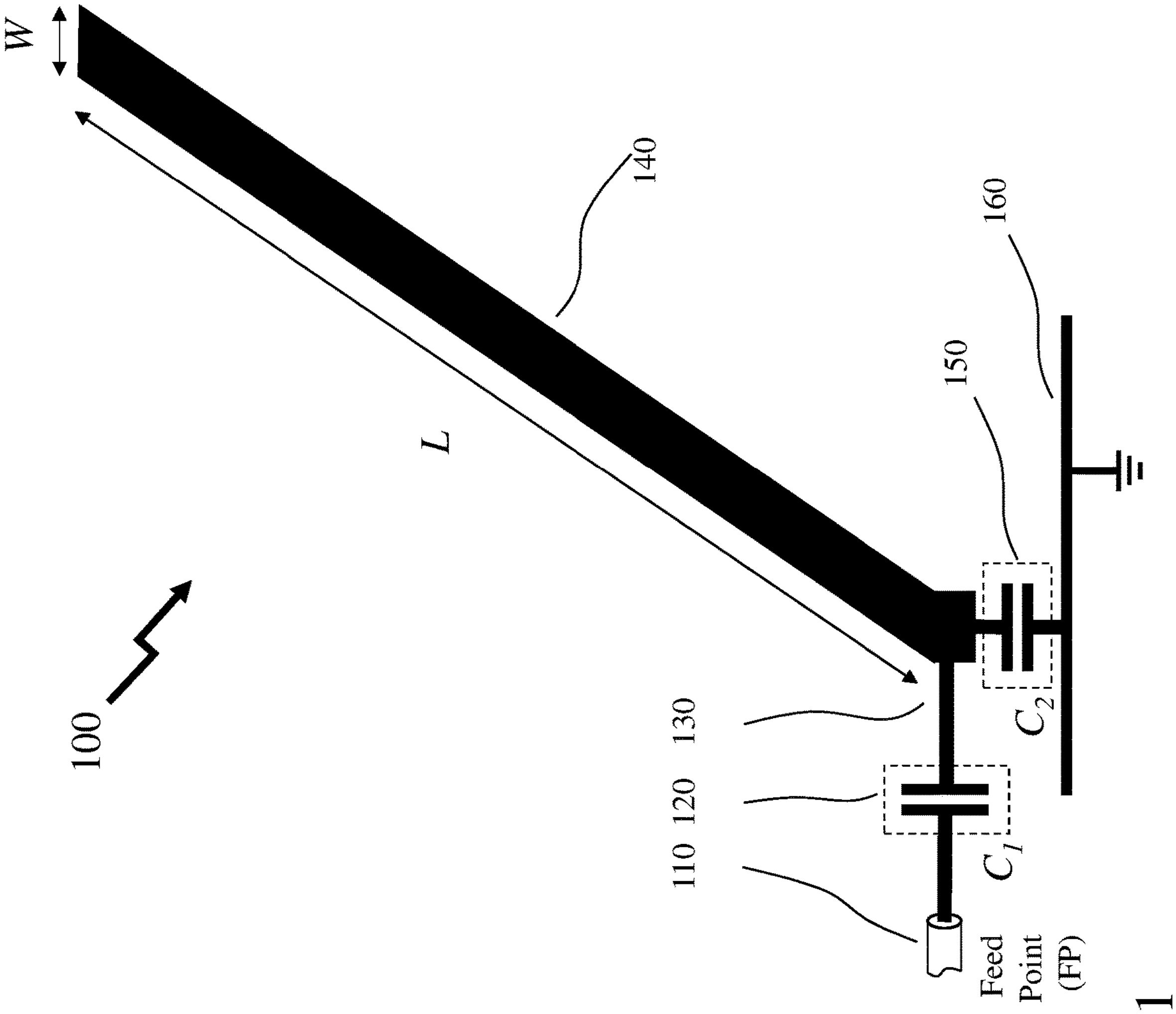
FIG. 1 depicts a single filar element for a filar antenna with capacitive series reactance between a microwave/RF feed point and the filar element according to an embodiment of the invention together with a shunt capacitive reactance to ground.

The present description is directed to antennas and more particularly to compact single band and multiband antennas for wireless systems such as satellite aided navigation and mobile satellite communications.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments. Further, the terms and phrases used herein are not intended to be limiting, but rather, to provide an understandable description of the invention.

Reference in the specification to "one embodiment," "an embodiment," "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may," "might," "can" or "could" be included, that particular component, feature, structure, or characteristic is not required to be included.

Reference to terms such as "left," "right," "top," "bottom," "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including," "comprising," "consisting" and grammatical variants thereof do not preclude the addition of one or more components, features, steps, integers or groups thereof and that the terms are not to be construed as specifying components, features, steps or integers. Likewise, the phrase "consisting essentially of," and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "filar element" (or filar) as used herein and throughout this disclosure may relate to, but not be limited to, a metallic element having a geometry of a line in that it is long, narrow, and thin. The term filar meaning "of or relating to a thread or line." According, a thin film metallic trace having a length substantially larger than its width is a linear element or filar element.

A "filar antenna element" as used herein and throughout this disclosure may relate to, but not be limited to, an element of a microwave or RF antenna comprising one or more filar elements.

A "filar antenna" as used herein and throughout this disclosure may relate to, but not be limited to, a microwave or RF antenna comprising one or more filar antenna elements wherein each of the filar antenna elements may comprise one or more filar elements. Accordingly, a filar antenna may, for example, comprise four filar antenna elements each comprising a pair of filar elements. Alternatively, it may comprise, for example, four filar antenna elements each comprising a single filar element or three filar elements, a single filar antenna element, eight filar antenna elements each comprising a pair of filar elements, or six filar antenna elements each comprising three filar elements. For example, FIGS. 1-3A and 4-8 each depict a filar antenna element according to an embodiment of the invention.

Figure 7:
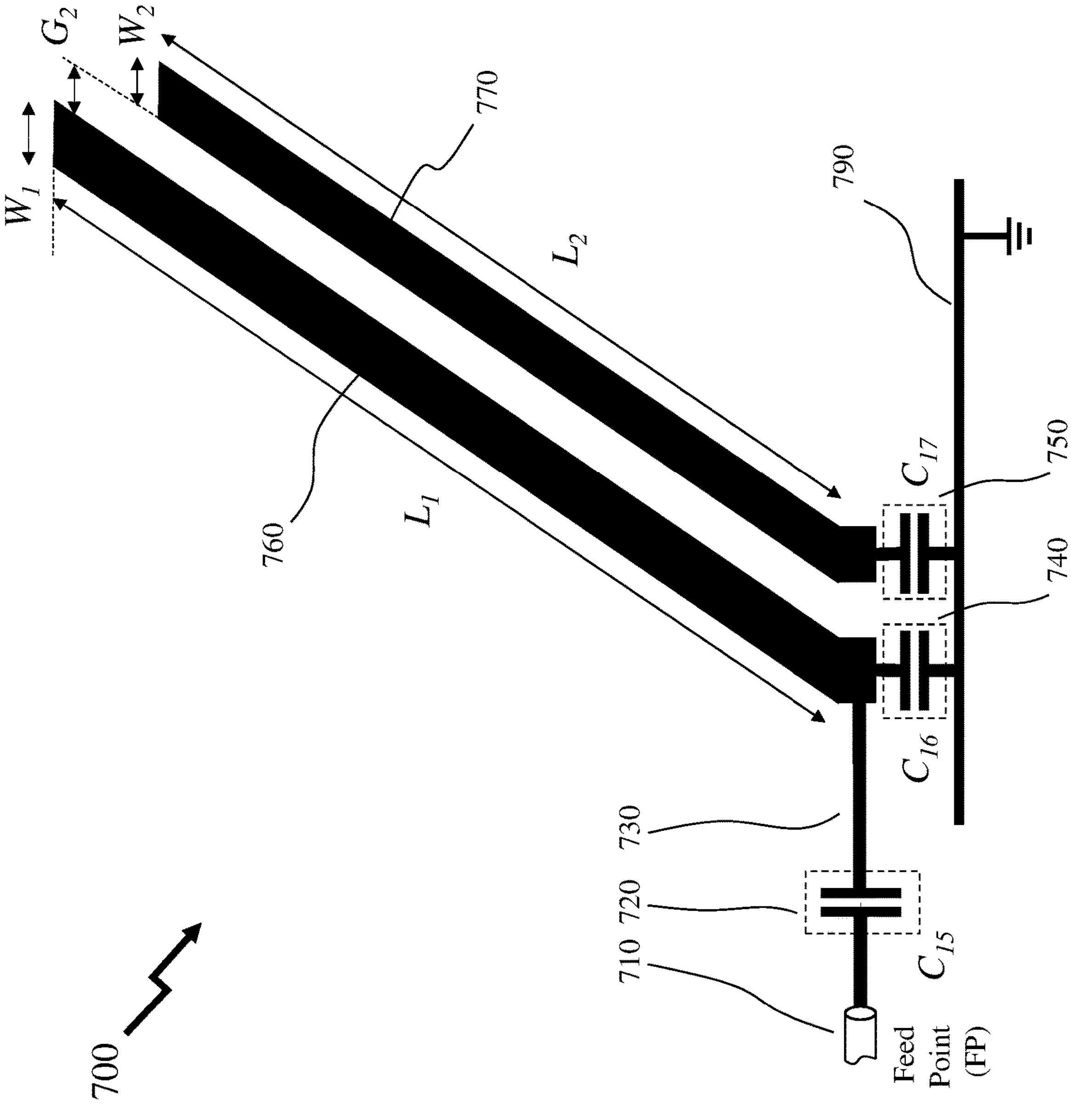
FIG. 7 depicts a dual filar antenna element for a filar antenna with capacitive series reactance between a microwave/RF feed point and the filar node in conjunction with filar-to-filar coupling according to an embodiment of the invention together with shunt capacitive reactances to ground.
Figure 8:
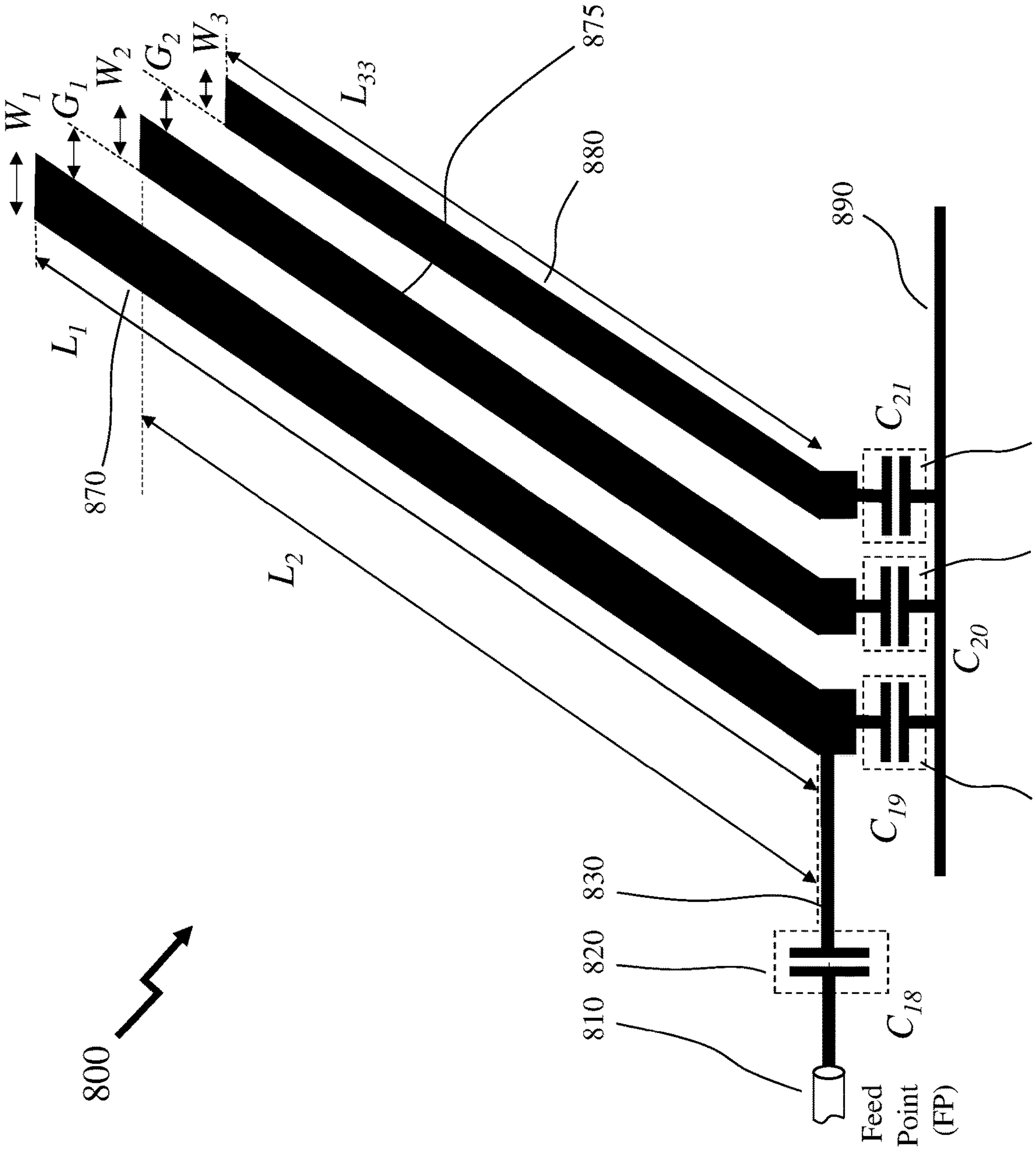
FIG. 8 depicts a triple filar antenna element for a filar antenna with capacitive series reactance between a microwave/RF feed point and the first filar node in conjunction with filar-to-filar coupling according to an embodiment of the invention together with shunt capacitive reactances to ground.
Figure 9:
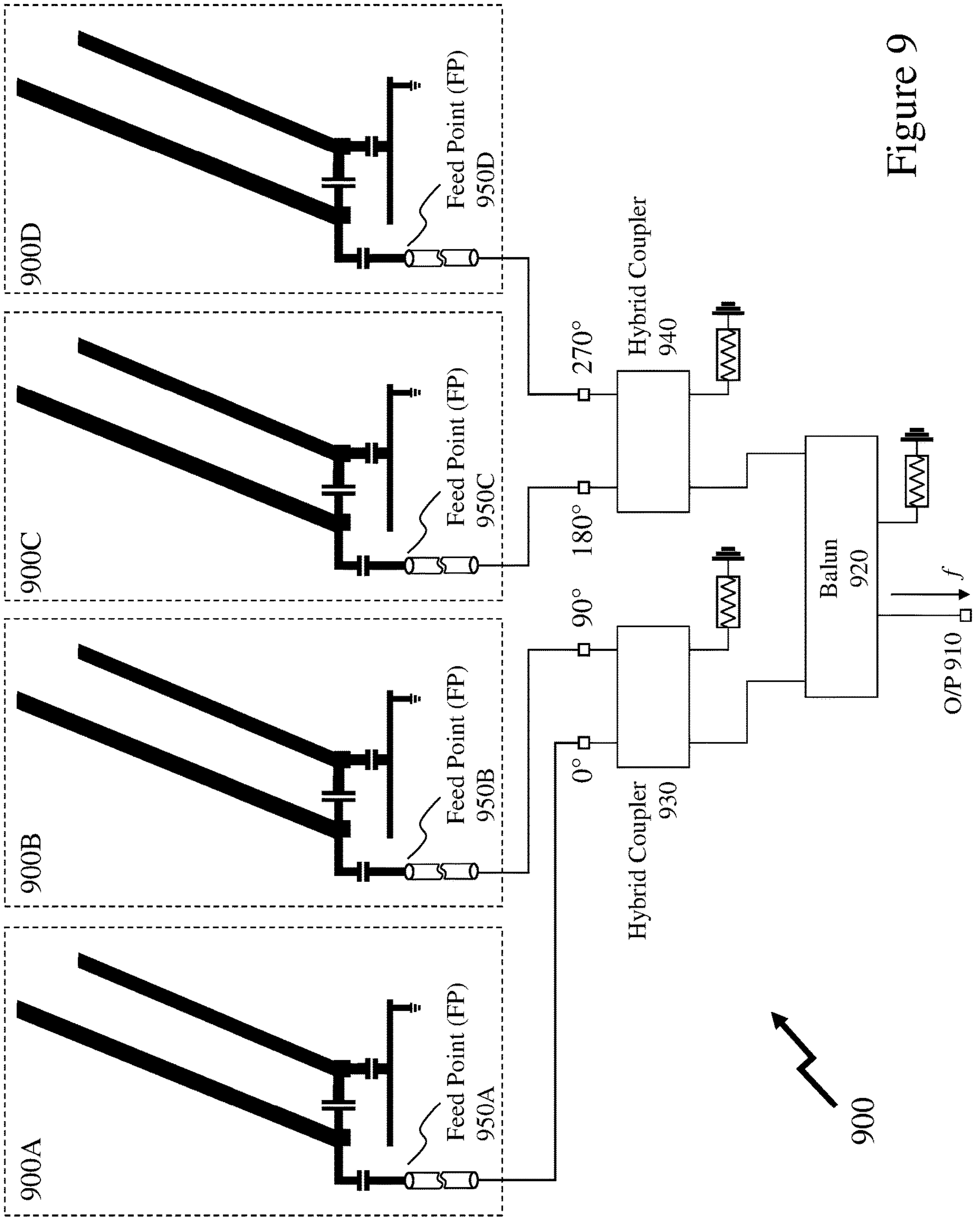
FIG. 9 depicts an exemplary microwave/RF circuit and antenna employing quad dual filar antenna elements with capacitive series reactances between the microwave/RF feed points and the filar nodes according to an embodiment of the invention together with a shunt capacitive reactance to ground.

A "feed point" (FP) as used herein and throughout this disclosure relates to or refers to a point at which a filar assembly such as those depicted in FIGS. 1-3A and 4-8 is coupled to a microwave circuit such as microwave feed network or microwave combining network such as depicted in FIG. 9.

A "filar node" as used herein, and throughout this disclosure relates to or refers to the point at which a filar antenna element is coupled to a feed point.

According to embodiments of the present invention compact filar antennas and filar element based antennas are provided which employ a capacitive series reactance between a microwave/RF feed point and a filar node. Further, according to embodiments of the present invention filar element based antennas are provided which employ capacitive series reactances between microwave/RF feed points and filar nodes in order to provide single band or multiband coverage whilst being fed via a conventional microwave/RF feed point.

According to embodiments of the present invention compact filar antennas and filar element based antennas are provided which employ a capacitive series reactance between a microwave/RF feed point and a filar node in order to provide single band or multiband coverage whilst being fed via a conventional microwave/RF feed point. In such filar element antennas according to embodiments of the invention subsequent filar elements to the initial filar element which is coupled to the feed point via the capacitive series reactance between the microwave/RF feed point and the filar node are coupled through electromagnetic coupling only to the initial filar element.

It would be understood by one of skill in the art that filar antennas and filar element based antennas described with respect to embodiments of the invention and as depicted in respect of FIGS. 1 to 9 may be formed, for example, as discrete metallic elements, as metallic elements upon a formed or shaped circuit board, as metallic elements upon a substrate, as metallic elements upon a flexible circuit board, or as metallic elements formed upon a flexible substrate.

It would be understood by one of skill in the art that filar antennas and filar element based antennas described with respect to embodiments of the invention and as depicted in respect of FIGS. 1 to 9 may be employed in antennas of varying three-dimensional geometries including, but not limited to, cylindrical, pyramidal, hemispherical, spherical, and fructo-conical.

Accordingly, the inventors established that a filar antenna element can be matched with a capacitive series reactance such that the impedance characteristic of the filar antenna element is shifted from an intrinsic impedance to a target impedance or substantially the target impedance, e.g. 50Ω, at the centre frequency of the frequency band of operation for the filar antenna element. Alternatively, the impedance may be targeted at another predetermined impedance, if required, such as 25Ω, 75Ω, 100Ω etc.

Referring to FIG. 1 there is depicted a single filar antenna element 100 for a filar antenna with capacitive series reactance between a microwave/RF feed point (FP) 110 and the filar element 140 according to an embodiment of the invention together with a shunt capacitive reactance to ground. As depicted the filar element 140 of length L is coupled at its first end to the FP 110 via a capacitive series reactance comprising first capacitor 120 and a track 130. The filar element 140 has its length L established according to Equation (1) such that its length is defined in dependence upon an odd integer multiple of quarter wavelengths, λ, at the centre frequency of the frequency band of operation for the filar antenna element 100 and an offset length, $L_0$. Within embodiments of the invention $L_0$ may be negative, zero, or positive and n is zero or a positive integer.

$$L=L_0+(2n+1)(\lambda/4) \quad (1)$$

The filar element 140 having a width W and thickness T (not depicted for clarity). The value of the capacitive series reactance comprising the first capacitor 120, $C_1$, may be established by experimentation or through modelling and simulation. The filar element 140 in addition to being coupled to the FP 110 via the first capacitor 120 may also be coupled to a ground plane 160 via a shunt capacitive reactance comprising second capacitor 150, $C_2$. Accordingly, the capacitive series reactance combined with the shunt capacitive reactance to ground are effective to transform the impedance of the filar node to the predetermined target impedance, e.g. the impedance at the feed-point (FP) 110.

It would be evident that whilst the embodiments of the invention within FIG. 1 above and FIGS. 2-9 described below are described with respect to filar antenna elements comprising one or more filar elements which are defined in terms of an odd integer multiple of a quarter wavelength of the wavelength at their operating frequency, see Equation (1), these may alternatively be defined in terms of an integer multiple of a half wavelength of the wavelength at their operating frequency, see Equation (2). In this instance, where defined as an integer multiple of the half wavelength the second end of each filar element which is open circuit in FIGS. 1 to 9 would be electrically coupled either to ground or a virtual ground. Further, within the description reference to an operating frequency of a filar element refers to the operating frequency of the filar element as modified by its electromagnetic environment, e.g. a radome protective cover, rather than the operating frequency of a filar element discretely in air. Accordingly, a filar element may have its length established according to Equation (2) such that its length is defined in dependence upon an integer multiple of half wavelengths at the centre frequency of the frequency band of operation for the filar element and an offset length. As above the offset length, $L_0$, may be negative, zero, or positive and n is a positive integer.

$$L=L_0+n(\lambda/2) \quad (2)$$

Figure 2:
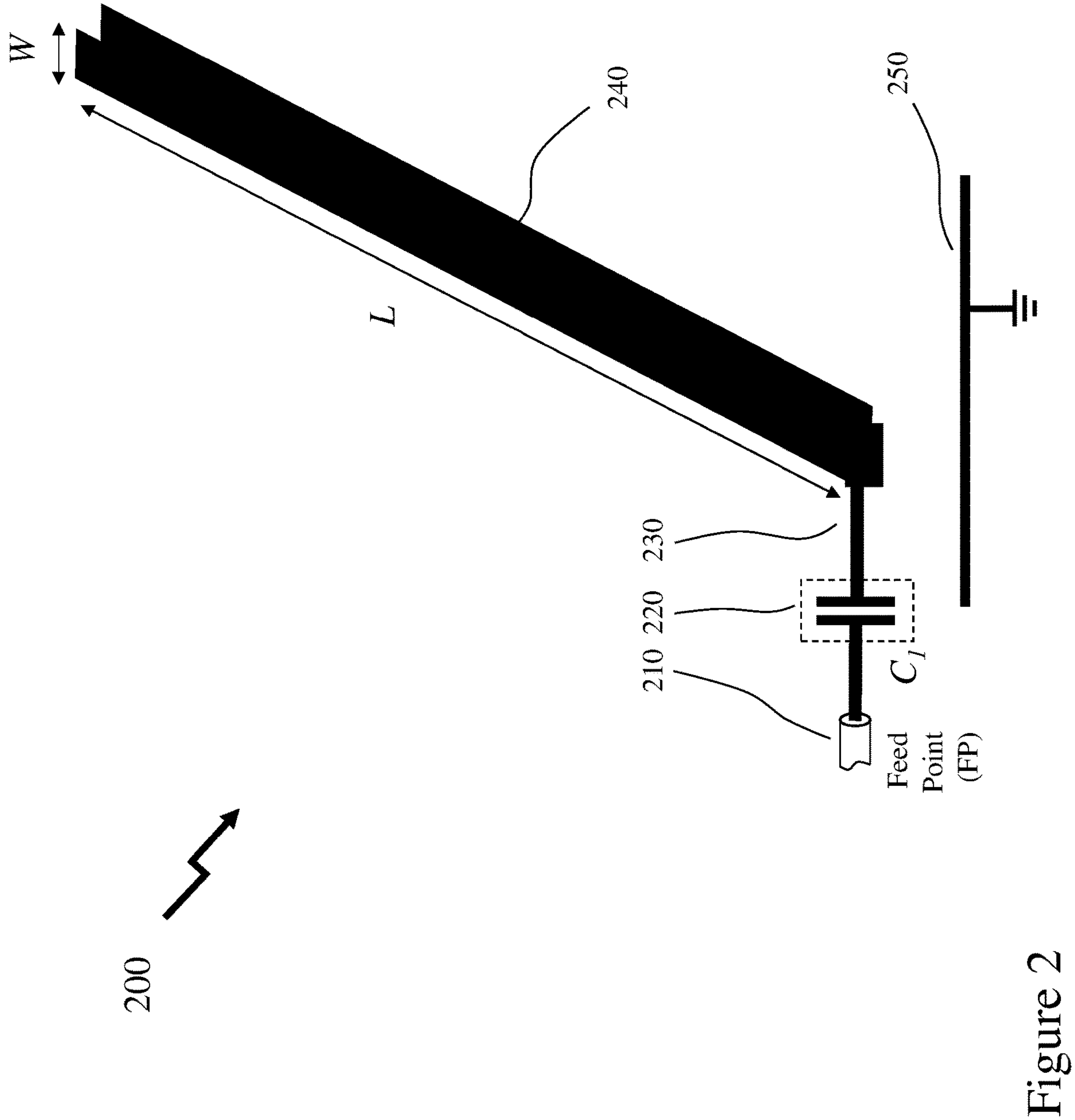
FIG. 2 depicts a single filar element for a filar antenna with capacitive series reactance between a microwave/RF feed point and the single filar element according to an embodiment of the invention.

Now referring to FIG. 2 there is depicted a single filar antenna element 200 for a filar antenna with capacitive series reactance between a microwave/RF feed point (FP) 210 and the filar element 240 according to an embodiment of the invention. As depicted the filar element 240 of length L is coupled at its first end to the FP 210 via a capacitive series reactance comprising first capacitor 220 and a track 230. The filar element 240 has its length L established according to Equation (1) such that its length is defined in dependence upon an odd multiple of quarter wavelengths, λ, at the centre frequency of the frequency band of operation for the filar antenna element 100 and an offset length, $L_0$. The filar element 240 having a width W and thickness T (not depicted for clarity). The value of the capacitive series reactance comprising the first capacitor 220, $C_1$, may be established by experimentation or through modelling and simulation.

Figure 3A:
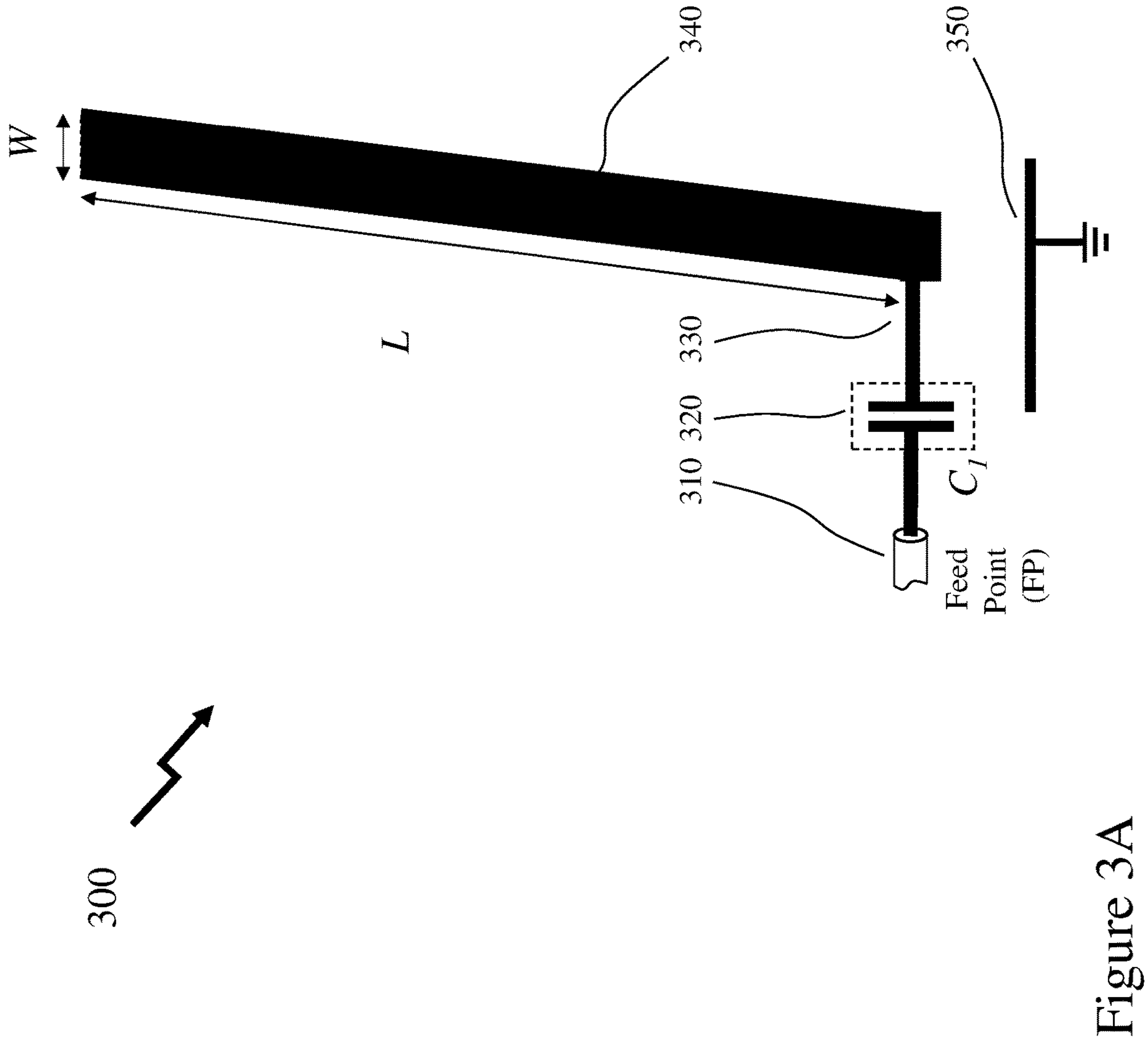
FIG. 3A depicts a single filar element for a filar antenna with capacitive series reactance between a microwave/RF feed point and the single filar element according to an embodiment of the invention.
Figure 3B:
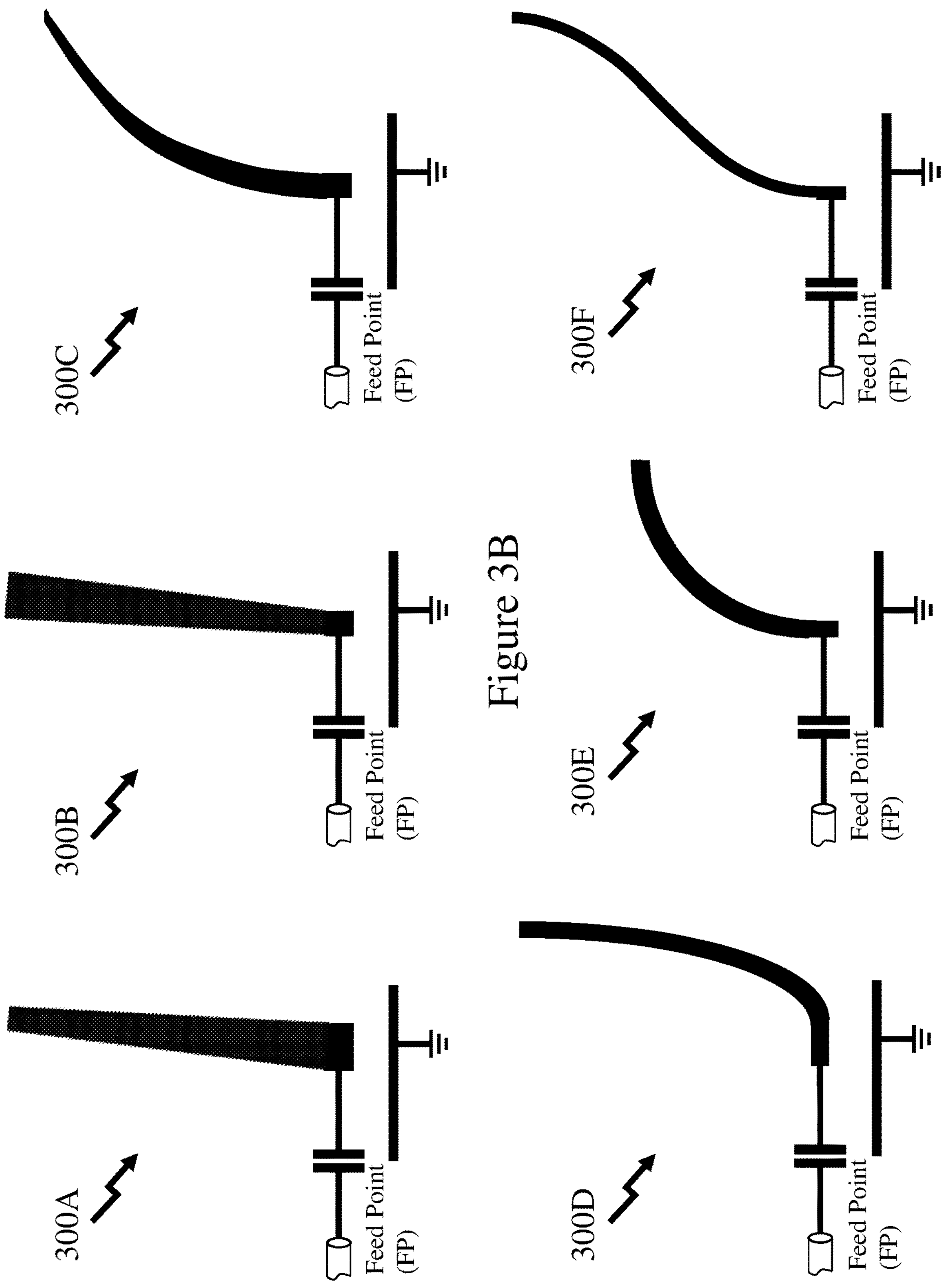
FIG. 3B depicts single filar elements for antennas according to embodiments of the invention with varying geometries employing the capacitive series reactance between a microwave/RF feed point and the filar node as depicted in FIG. 3A.

Referring to FIG. 3A there is depicted a single filar antenna element 300 for a filar antenna with capacitive series reactance between a microwave/RF feed point (FP) 310 and the filar element 340 according to an embodiment of the invention. As depicted the filar element 340 of length L is coupled at its first end to the FP 310 via a capacitive series reactance comprising first capacitor 320 and a track 330. The filar element 340 has its length L established according to Equation (1) such that its length is defined in dependence upon an odd multiple of quarter wavelengths, λ, at the centre frequency of the frequency band of operation for the filar antenna element 300 and an offset length, $L_0$. The filar element 340 having a width W and thickness T (not depicted for clarity). The value of the capacitive series reactance comprising the first capacitor 320, $C_1$, may be established by experimentation or through modelling and simulation.

In FIGS. 1-2 and FIGS. 4-9 the filar antennal elements are depicted as being slanted such that at increasing heights away from the ground plane the filar element is also further away from the feed point. This allows the overall height of a filar antenna employing one or more such slanted filar elements to be reduced in height. It would be evident to one of skill in the art that the slant applied to the filar elements such as depicted in FIGS. 1-2 and 4-9 may be varied within different antenna designs according to the desired overall dimensions of the antenna both in terms of height but also length and width or diameter. It would also be evident to one of skill in the art that the slant applied to the filar elements such as depicted in FIGS. 1-2 and 4-9 may be reversed such that the filar element slants in the opposite direction.

Additionally, within filar antenna elements exploiting multiple filar elements such as FIGS. 4-9 whilst these are depicted with each filar element parallel to each other filar element this is not a design limitation to be implied within embodiments of the invention. Optionally, the multiple filar elements may vary in separation with increasing height away from the ground plane such that within different embodiments of the invention their separations increase with increasing height away from the ground plane, their separations decrease with increasing height away from the ground plane, and some filar elements have their separations increase with increasing height away from the ground plane whilst other filar elements their separations decrease with increasing height away from the ground plane, for example.

Further, whilst the filar elements depicted in FIGS. 1-9 are depicted as being linear and of constant width (and implied constant thickness) this may not be for all embodiments of the invention. For example, filar elements may exhibit linear tapers in width and/or thickness, non-linear tapers in width and/or thickness including those defined by a mathematical equation(s), for example. Similarly, the filar elements may be non-linear such as those defined by a mathematical equation(s) or geometrical profile(s), for example. Referring to FIG. 3B there are depicted some examples of single filar elements for antennas according to embodiments of the invention with varying geometries employing the capacitive series reactance between a microwave/RF feed point and the single filar element versus a linear uniform geometry as depicted in FIG. 3A. These being:

- First image 300A depicting a filar element with linear taper which decreases in width linearly away from the ground plane;
- Second image 300B depicting a filar element with linear taper which increases in width linearly away from the ground plane;
- Third image 300C depicting a filar element with a curved taper which decreases in width along the filar element;
- Fourth image 300D depicting a filar element with a parabolic profile of constant width along the filar element;
- Fifth image 300E depicting a filar element with a circular profile of constant width along the filar element; and Sixth image 300F depicting a filar element with a sinusoidal profile of constant width.

Figure 4:
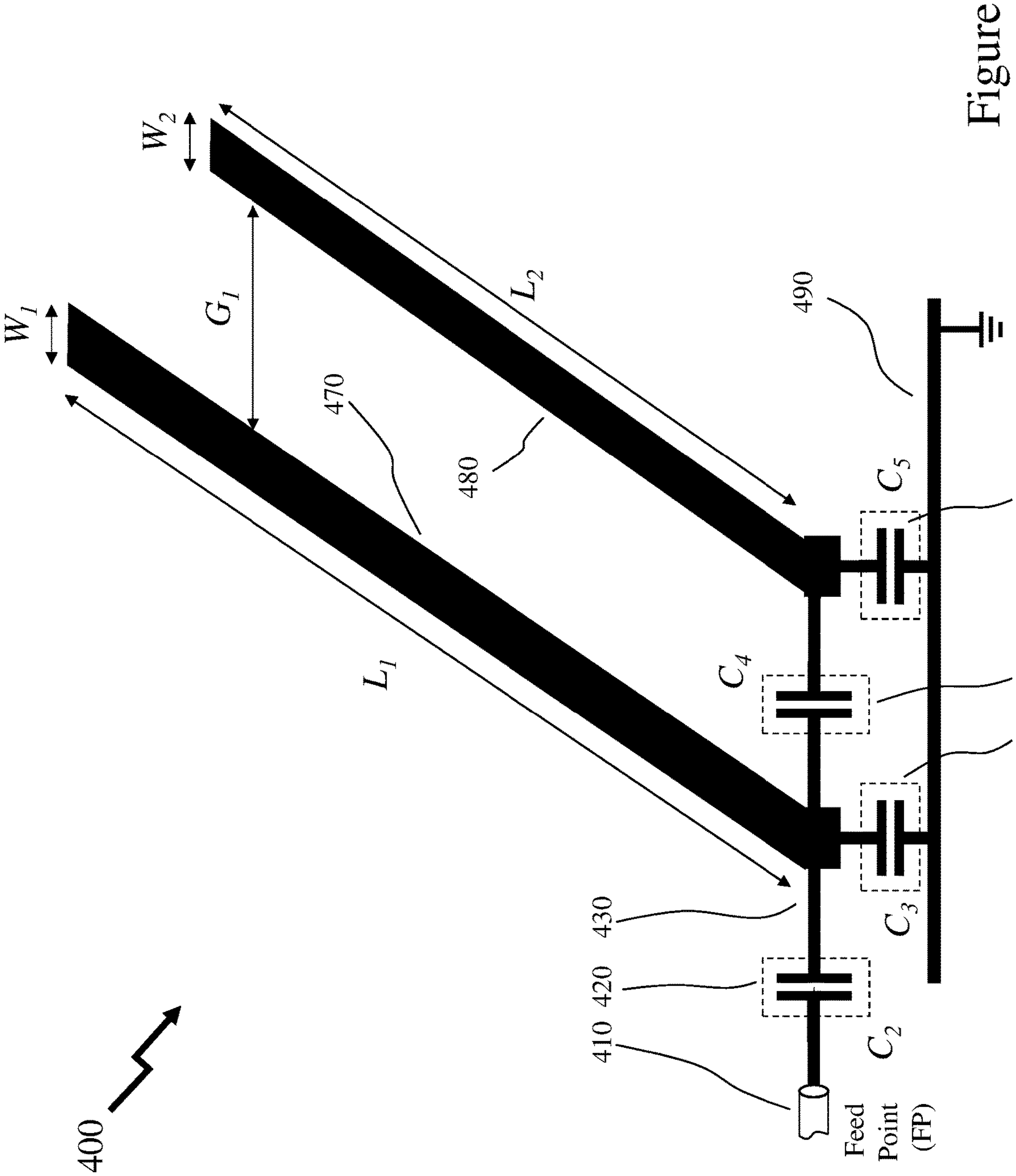
FIG. 4 depicts a dual filar antenna element for a filar antenna with capacitive series reactances between a microwave/RF feed point and the filar node according to an embodiment of the invention together with shunt capacitive reactances to ground.

Now referring to FIG. 4 there is depicted a dual filar element 400 for a filar antenna with capacitive series reactance between a microwave/RF feed point and the filar node according to an embodiment of the invention combined with shunt capacitive reactances to ground. Dual filar element 400 comprises a first filar element 470 and a second filar element 480. First filar element 470 having a length $L_1$, width $W_1$, and thickness $T_1$ (not depicted) whilst second filar element 480 has a length, $L_2$, width $W_2$, and thickness $T_2$ (not depicted). The second filar element 480 being separated from the first filar element 470 by a gap $G_1$.

Each of the first filar element 470 and the second filar element 480 have a first end proximate the ground plane and electrically coupled to the feed point (FP) 410 and a second distal end. The first end of the first filar element 470, the filar node, is coupled to the FP 410 via track 430 and first capacitor 420, $C_2$ and to ground 440 via second capacitor 440, $C_3$. The first end of the second filar element 480 is electrically coupled to the FP 410 via a third capacitor 450, $C_4$, the first end of the first filar element, the track 430 and the first capacitor 420, $C_2$. The first end of the second filar element 480 also being electrically coupled to ground via fourth capacitor 460, $C_5$.

Accordingly, microwave or RF signals fed to the dual element 400 at feed point 410 within a first frequency band centered around $F_1$ are radiated by the first filar element 470 which has a length, $L_1$, as defined by Equation (1) where the impedance of the first filar element 470 is matched to the target impedance via the first capacitor 420, $C_2$, in conjunction with the shunt capacitive reactance from the second capacitor 440, $C_3$. Microwave or RF signals fed to the dual element 400 at feed 410 within a second frequency band centered around $f_2$ are radiated by the second filar element 480 which has a length, $L_2$, as defined by Equation (1) where the impedance of the second filar element 480 is tuned to the target impedance via the third capacitor 450, $C_4$, in conjunction with the shunt capacitive reactance from the fourth capacitor 460, $C_5$, together with the intervening first capacitor 420, $C_2$, and second capacitor 440, $C_3$. For a receiver the signals are received by the first and second filar elements 470 and 480 respectively and coupled to the FP 410. Accordingly, the combined capacitive series reactance(s) combined with the shunt capacitive reactance(s) to ground are effective to transform the impedance of each filar element, e.g. first filar element 470 or second filar element 480, to the predetermined target impedance, e.g. the impedance at the feed-point (FP) 410.

Figure 5:
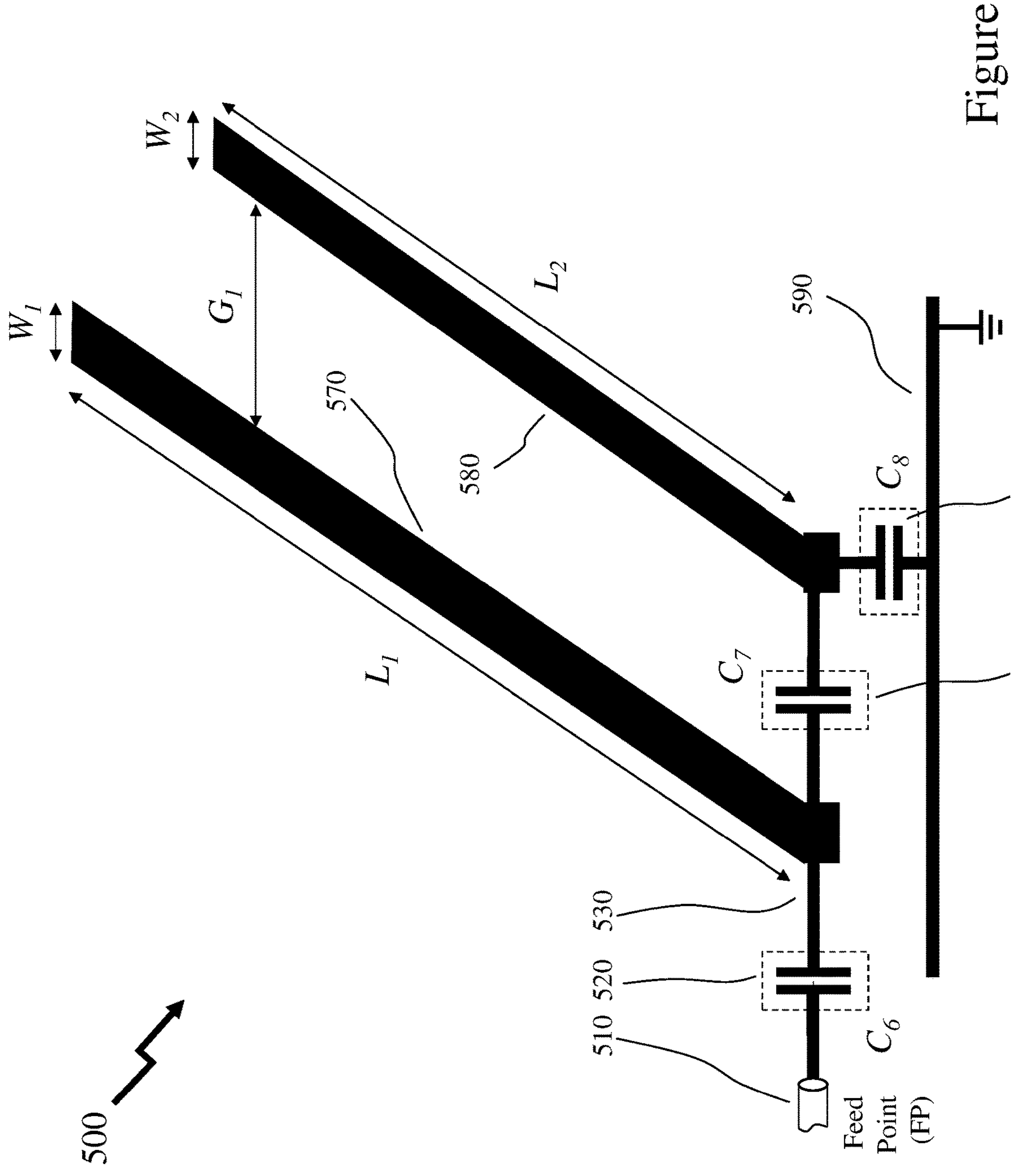
FIG. 5 depicts a dual filar antenna element for a filar antenna with capacitive series reactances between a microwave/RF feed point and the filar node according to an embodiment of the invention together with a shunt capacitive reactance to ground.

Now referring to FIG. 5 there is depicted a dual filar element 500 for a filar antenna with capacitive series reactances between a microwave/RF feed point and the filar elements according to an embodiment of the invention together with a shunt capacitive reactance to ground. Dual filar element 500 comprises first filar element 570 and second filar element 580. First filar element 570 having a length $L_1$, width $W_1$, and thickness $T_1$ (not depicted) whilst second filar element 580 has a length, $L_2$, width $W_2$, and thickness $T_2$ (not depicted). The second filar element 580 being separated from the first filar element 570 by a gap $G_1$.

Each of the first filar element 570 and the second filar element 580 having a first end proximate the ground plane and electrically coupled to the feed point (FP) 510 and a second distal end. The first end of the first filar element 570 is coupled to the FP 510 via track 530 and first capacitor 520, $C_6$. The first end of the second filar element 580 is electrically coupled to the FP 510 via a second capacitor 540, $C_7$, the first end of the first filar element, the track 530 and the first capacitor 520, $C_6$. The first end of the second filar element 580 also being electrically coupled to ground via third capacitor 550, $C_8$. Optionally, the third capacitor 550, $C_8$, may be omitted within other embodiments of the invention. Alternatively, the third capacitor 550, $C_8$, may be omitted within other embodiments of the invention but a shunt capacitive reactance provided between the first end of the first filar element and ground.

Figure 6:
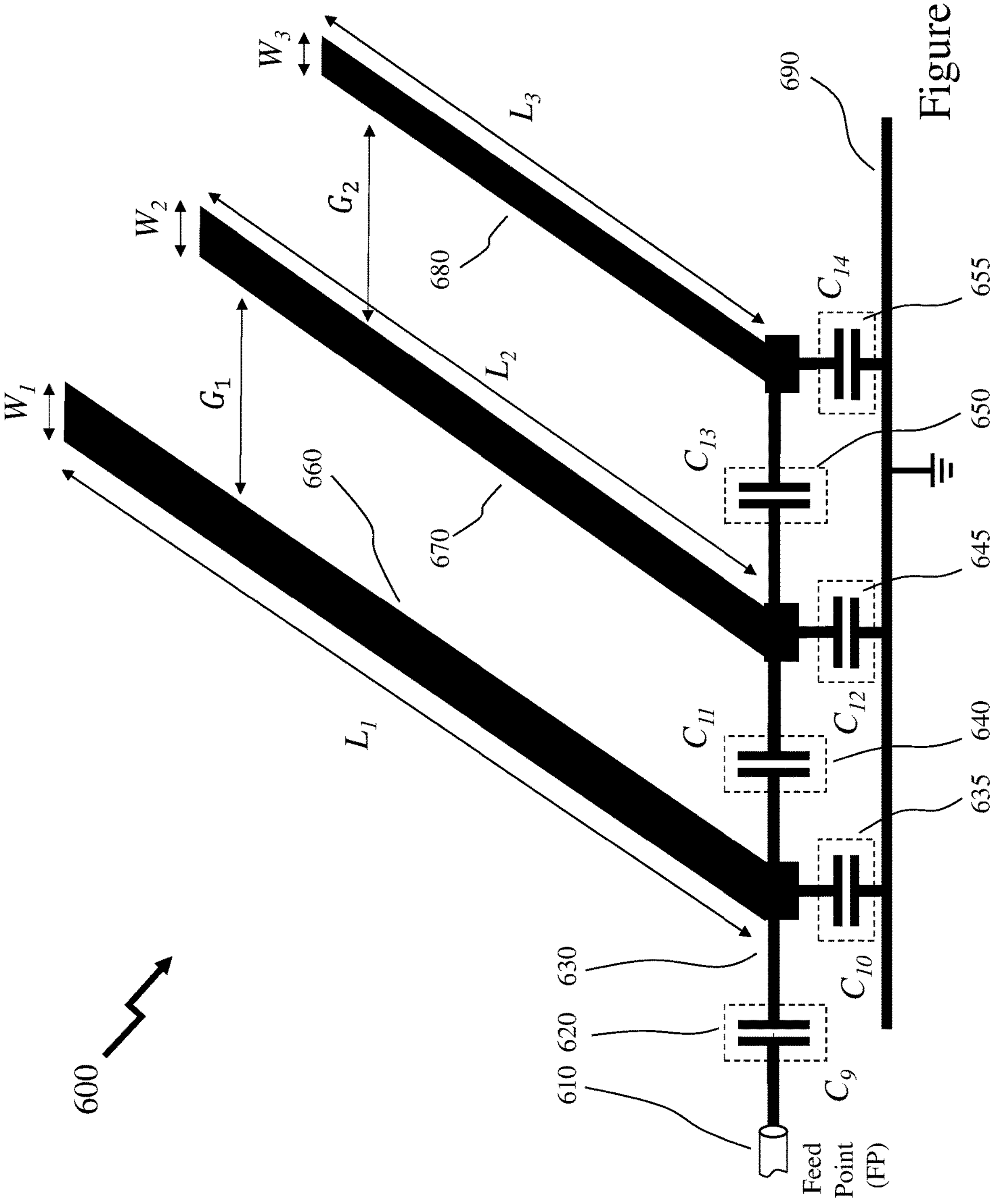
FIG. 6 depicts a triple filar antenna element for a filar antenna with capacitive series reactances between a microwave/RF feed point and the filar node according to an embodiment of the invention together with shunt capacitive reactances to ground.

Referring to FIG. 6 there is depicted a triple filar element 600 for a filar antenna with capacitive series reactances between a microwave/RF feed point and the filar elements according to an embodiment of the invention together with shunt capacitive reactances to ground. The triple filar element 600 comprising a first filar element 660, second filar element 670, and third filar element 680. Accordingly, these are dimensioned as follows:

- first filar element 660 having a length $L_1$, width $W_1$, and thickness $T_1$ (not depicted);
- second filar element 670 has a length $L_2$, width $W_2$, and thickness $T_2$ (not depicted); and
- third filar element 680 having a length $L_3$, width $W_3$, and thickness $T_3$ (not depicted).

The second filar element 670 being separated from the first filar element 660 by a gap $G_1$ and the third filar element 680 being separated from the second filar element 670 by a gap $G_2$. Typically, $T_1=T_2=T_3$. Within FIG. 6 as depicted $L_1>L_2>L_3$. Alternatively, within other embodiments of the invention $L_1<L_2<L_3$ or $L_1<L_2>L_3$, etc.

As depicted in FIG. 6 the first filar element 660 is electrically coupled to a feed point (FP) 610 via first capacitor 620, $C_9$, and track 630 whilst also being electrically coupled to ground 690 via second capacitor 635, $C_{10}$. The second filar element 670 is electrically coupled to the first filar element 660 via third capacitor 640, $C_{11}$, and coupled to ground 690 via fourth capacitor 645, $C_{12}$. Similarly, the third filar element 680 is electrically coupled to the second filar element 670 via fifth capacitor 650, $C_{13}$, and coupled to ground 690 via sixth capacitor 655, $C_{14}$. Optionally, the second capacitor 635, $C_{10}$, may be omitted within other embodiments of the invention. Optionally, the second capacitor 635, $C_{10}$, the fourth capacitor 645, $C_{12}$, and the sixth capacitor 655, $C_{14}$, may be omitted all together or in different subsets within other embodiments of the invention.

Now referring to FIG. 7 there is depicted a dual filar element 700 for a filar antenna with capacitive series reactance between a microwave/RF feed point and the first filar element in conjunction with filar-to-filar coupling according to an embodiment of the invention together with shunt capacitive reactances to ground. The dual filar element 700 comprising a first filar element 760 and a second filar element 770 which are dimensioned as follows:

- first filar element 760 having a length $L_1$, width $W_1$, and thickness $T_1$ (not depicted); and
- second filar element 770 has a length $L_2$, width $W_2$, and thickness $T_2$ (not depicted).

The second filar element 770 being separated from the first filar element 760 by a gap $G_1$. Typically, $T_1=T_2$. Within FIG. 7 as depicted $L_1>L_2$. Alternatively, within other embodiments of the invention $L_1<L_2$.

As depicted in FIG. 7 the first filar element 760 is electrically coupled to a feed point (FP) 710 via first capacitor 720, $C_{15}$, and track 730 whilst also being electrically coupled to ground 690 via second capacitor 740, $C_{16}$. The second filar element 770 is not electrically connected to the first filar element 660 via a capacitor such as described and depicted in respect of FIGS. 4 and 5 but is electrically coupled to ground 790 via third capacitor 750, $C_{17}$. In contrast to the direct electrical coupling within FIGS. 4 and 5 the second filar element 770 is electromagnetically coupled to the first filar element 760.

Optionally, the third capacitor 750, $C_{17}$, may be omitted. Accordingly, the gap $G_1$ between the first filar element 760 and second filar element 770 in order to support electromagnetically coupling would be smaller than that employed in FIGS. 4 and 5 where the second filar element 770 is electrically coupled via a capacitor to the first filar element.

Referring to FIG. 8 there is depicted a triple filar element 800 for a filar antenna with capacitive series reactance between a microwave/RF feed point and the first filar element in conjunction with filar-to-filar coupling according to an embodiment of the invention together with shunt capacitive reactances to ground. The triple filar element 800 comprising a first filar element 870, second filar element 875, and third filar element 880. Accordingly, these are dimensioned as follows:

first filar element 870 having a length $L_1$, width $W_1$, and thickness $T_1$ (not depicted);

second filar element 875 has a length $L_2$, width $W_2$, and thickness $T_2$ (not depicted); and third filar element 880 having a length $L_3$, width $W_3$, and thickness $T_3$ (not depicted).

The second filar element 875 being separated from the first filar element 870 by a first gap $G_1$. and the third filar element 880 being separated from the second filar element 875 by a second gap, $G_1$. Typically, $T_1=T_2=T_3$.

As depicted in FIG. 8 the first filar element 870 is electrically coupled to a feed point (FP) 810 via first capacitor 820, $C_{18}$, and track 830 whilst also being electrically coupled to ground 890 via second capacitor 840, $C_{19}$. The second filar element 875 is not electrically connected to the first filar element 870 via a capacitor such as described and depicted in respect of FIGS. 4 and 5 but is electrically coupled to ground 890 via third capacitor 850, $C_{20}$. Similarly, the third filar element 880 is not electrically connected to the second filar element 875 via a capacitor as depicted in respect of FIGS. 4 and 5 but it is electrically coupled to ground 890 via a fourth capacitor 860, $C_{21}$. In contrast to the direct electrical coupling within FIGS. 4 and 5 the second filar element 770 is electromagnetically coupled to the first filar element 870 whilst the third filar element 880 is electromagnetically coupled to the first filar element 870 directly or indirectly via the second filar element 875.

Optionally, the third capacitor 850, $C_{20}$, and/or the fourth capacitor 860, $C_{21}$, may be omitted. Accordingly, the gaps $G_1$ and $G_2$ between the first filar element 870 and second filar element 875 and third filar element 875 and second filar element 875 respectively in order to support electromagnetically coupling would be smaller than that employed in FIGS. 4 and 5 where the second filar element 875 and third filar element 880 are electrically coupled via capacitors to the first filar element.

Now referring to FIG. 9 there is depicted a schematic 900 of an exemplary microwave/RF circuit and antenna employing four dual filar elements with capacitive series reactances between the microwave/RF feed points and the filar nodes according to an embodiment of the invention together with a shunt capacitive reactance to ground. Accordingly, within schematic 900 are depicted first to fourth filar antenna elements 900A to 900D respectively which are depicted as being of similar design to that depicted in FIG. 5 with capacitive series reactance between the first to fourth feed points (FPs) 950A to 950D respectively and the respective first to fourth filar antenna elements 900A to 900D. Accordingly, first to fourth FPs 950A to 950D respectively may be a connection to a microwave feed circuit or microwave combiner circuit such as through discrete microwave or RF cables or a circuit board for example. First and second filar antenna elements 900A and 900B are coupled via first and second FPs 950A and 950B respectively to first hybrid coupler 930. Third and fourth filar antenna elements 900C and 900D are coupled via third and fourth FPs 950C and 950D respectively to second hybrid coupler 940.

A first output of the first hybrid coupler 930 is coupled to Balun 920 whilst a second output of the first hybrid coupler 930 is terminated with a load resistance. A first output of the second hybrid coupler 940 is coupled to Balun 920 whilst a second output of the second hybrid coupler 940 is terminated with a load resistance. Similarly, a first output of the Balun 920 is coupled to an output port whilst a second output of the Balun 920 is optionally terminated in a load resistance. Accordingly, considering a filar antenna employing first to fourth antenna elements 900A to 900D respectively formed upon a flexible circuit board or carrier and wound into a cylinder then these receive couple four sets of received microwave/RF signals which are combined through the first and second hybrid couplers 930 and 940 and Balun 920 to generate an output signal at the output port 910. Where the microwave/RF signals have relative phases received by the first to fourth antenna elements have a relative phase difference sequentially of 0°, 90°, 180°, and 270° then these signals are initially combined within each of first and second hybrid couplers 930 and 940 and then within the Balun 920 to generate an output signal. The output ports of the first and second hybrid couplers 930 and 940 being those summing the inputs whilst the other output ports terminated with load resistors represent the ports yielding the difference between the two inputs. Alternatively, the reverse scenario results in an input signal coupled to the Balun 920 being initially split into two signals 180° out of phase with respect to one another which are then coupled to the first and second hybrid couplers 930 and 940 respectively which each generate a pair of signals with 90° relative phase such that the circuit provides four output signals at relative phase difference sequentially of 0°, 90°, 180°, and 270° which are then radiated by the first to fourth antenna elements 900A to 900D respectively combining to generate a circularly polarized signal from the antenna. Accordingly, when employed as a receiver the antenna receives circularly polarized signals. Embodiments of the invention according to the sequence of phases implemented may operate to receive and/or transmit left hand circularly polarized signals or right hand polarized signals. Optionally, within other embodiments of the invention the Balun 920 may be a transformer.

Within FIGS. 1 to 9 the filar antenna elements and antennas employing them exploit one or more filar elements which are coupled to a feed point and are disposed relative to a ground plane without or without capacitors disposed between all or some of the filar elements and the ground plane. Within embodiments of the invention this ground plane may be formed, for example, on one side of or upon a layer of a printed circuit board or electronic circuit, flexible PCB, or an equivalent, hereinafter referred to as a PCB for ease of reference. Within embodiments of the invention the filar elements are mechanically and/or electrically coupled to the other side of the PCB to that on which the ground plane is formed or upon a side of the PCB when the ground plane is formed by a layer within the PCB. Accordingly, the PCB may be a single or multi-layer circuit providing contacts for electrical attachment of each of the filar antenna elements and therein the individual filar elements. Further, the PCB may support either integrated within it or attached to it capacitors to provide the capacitive series reactance from the feed points to the first filar elements as well as, optionally, the capacitors disposed between the filar elements where multiple filar elements are employed and capacitors coupling filar elements to the ground plane.

Accordingly, with respect to FIG. 9 a microwave receiver and/or microwave transmitter can be coupled to the microwave quadrature feed network through the port. The four feed points feed nodes are connected to the four filar nodes of the filar antenna elements described above wherein these may be spatially located on a former, such as a PCB implementation of the feed network such that phase increases uniformly (e.g., in 90° steps) as a function of position (described by azimuth angle) around the printed circuit board and the feed network provides equal amplitude signals to the four antenna coupling terminals. Each of the filar antenna elements, whether a single filar element based for a single frequency band or multiple filar element based for multiple frequency band operation may exploit a former such as the plastic carrier of a flexible microwave circuit for example allowing the four elements to be formed upon a single former providing ease of handling, enhanced material considerations etc. This former may be formed into the cylinder for example.

Within other embodiments of the invention the former may be designed and formed to provide four antennas evenly distributed around the periphery of a hemispherical surface and form the antennas across this hemispherical surface. Within other embodiments of the invention the former may be designed and formed to provide the four antennas evenly distributed around the surface of a spherical surface and form the antennas across this spherical surface. Within other embodiments of the invention the former may be designed and formed to provide the four antennas evenly distributed around the periphery of a frusto-conical surface and form the antennas across this frusto-conical surface. Within other embodiments of the invention the former may be designed and formed to provide the four antennas evenly distributed around the periphery of a polygonal surface and form the antennas across this polygonal surface. Such a polygonal surface may have 4, 5, 6, 7, 8, etc. sides or other numbers although typically more sides yield lower angular transitions and hence induced stress and/or fatigue.

Within the embodiments of the invention described and depicted above in respect of FIGS. 7 to 8 the capacitors for the other filar elements electromagnetically coupled to the first filar element with the electrical feed have been described and depicted as being at the same end of the overall antenna construction as the capacitor attached to that first filar element. However, in other embodiments of the invention the electrical connection(s) to the other capacitors may be disposed at either end of their respective filar elements as appropriate for the overall construction, footprint, performance etc.

Within the embodiments of the invention described and depicted above in respect of FIGS. 1 to 8 the capacitors, such as those providing the capacitive series reactance between the first filar element and the feed points, are depicted as connecting to the filar elements at a first end, this being the end closest to the ground plane. However, within other embodiments these connections between filar elements and capacitors may be implemented towards the end of the filar elements closest to the ground plane rather than at the end.

It would be evident to one of skill in the art that the filar elements are electrical conductors (conductors) formed from a suitable conductive material or combination of conductive materials in alloy and/or layered form. Such conductive materials may include, but not be limited to, copper, gold, silver, aluminum, titanium, tungsten, platinum, palladium, and zinc.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of providing a filar antenna element comprising:

providing a first capacitor, the first capacitor electrically coupled between a first end of a first conductor disposed above a ground plane and a feed point; wherein the first capacitor either receives a first microwave signal to be radiated by the first conductor or receives a second microwave signal from the first conductor.

2. The method according to claim 1, wherein the first conductor has a predetermined length established in dependence of a center frequency of a frequency band of operation of the filar antenna element.

3. The method according to claim 1, wherein the first conductor has a predetermined length established in dependence of a center frequency of a frequency band of operation of the first conductor.

4. The method according to claim 1, further comprising providing a second capacitor, the second capacitor electrically coupled between the first end of the first conductor and the ground plane.

5. The method according to claim 1, further comprising providing a second capacitor, the second capacitor electrically coupled between a first end of the first conductor and a first end of a second conductor which is also disposed above the ground plane.

6. The method according to claim 5, wherein the first conductor has a predetermined length established in dependence of another center frequency of another frequency band of operation of the filar antenna element.

7. The method according to claim 1, further comprising providing a second capacitor, the second capacitor electrically coupled between a first end of the first conductor and a first end of a second conductor which is also disposed above the ground plane; and providing a third capacitor electrically coupled between the first end of the second conductor and the ground plane.

8. The method according to claim 7, wherein the second conductor has a predetermined length established in dependence of another center frequency of another frequency band of operation of the filar antenna element.

9. The method according to claim 1, further comprising providing a second capacitor, the second capacitor electrically coupled between a first end of the first conductor and a first end of a second conductor which is also disposed above the ground plane; and providing a third capacitor electrically coupled between the first end of the second conductor and the ground plane;

providing a fourth capacitor electrically coupled between the first end of the first conductor and the ground plane.

10. The method according to claim 9, wherein the first conductor has a predetermined length established in dependence of a center frequency of a frequency band of operation of the filar antenna element; and the second conductor has a predetermined length established in dependence of another center frequency of another frequency band of operation of the filar antenna element.

11. The method according to claim 1, further comprising providing a second capacitor, the second capacitor electrically coupled between a first end of a second conductor disposed above a ground plane and the ground plane; and providing a third capacitor electrically coupled between the first end of the first conductor and the ground plane.

12. The method according to claim 11, wherein the first conductor has a predetermined length established in dependence of a center frequency of a frequency band of operation of the filar antenna element; and the second conductor has a predetermined length established in dependence of another center frequency of another frequency band of operation of the filar antenna element; wherein the first conductor and second conductor are radiatively coupled.

* * * * *